(12) United States Patent
Nohales Piqueras et al.

(10) Patent No.: US 9,394,395 B2
(45) Date of Patent: Jul. 19, 2016

(54) UNSATURATED POLYCARBONATE DIOL, PROCESS OF PREPARING SUCH POLYCARBONATE DIOL AND ITS USE

(71) Applicant: UBE CHEMICAL EUROPE, S.A., Castellon de la Plana, Castellon (ES)

(72) Inventors: Andres Nohales Piqueras, Castellon (ES); Victor Ignacio Costa Vaya, Castellon (ES)

(73) Assignee: UBE CHEMICAL EUROPE, S.A., Castellon (ES)

( * ) Notice: Subject to any disclaimer, the term of this patent is extended or adjusted under 35 U.S.C. 154(b) by 0 days.

(21) Appl. No.: 14/230,409

(22) Filed: Mar. 31, 2014

(65) Prior Publication Data
US 2014/0316078 A1    Oct. 23, 2014

(30) Foreign Application Priority Data
Apr. 19, 2013   (EP) .................................... 13382144

(51) Int. Cl.
| | |
|---|---|
| *C08G 64/02* | (2006.01) |
| *C08G 64/42* | (2006.01) |
| *C08G 63/64* | (2006.01) |
| *C08F 283/02* | (2006.01) |
| *C08G 18/44* | (2006.01) |
| *C08G 64/30* | (2006.01) |

(52) U.S. Cl.
CPC .............. *C08F 283/02* (2013.01); *C08G 18/44* (2013.01); *C08G 63/64* (2013.01); *C08G 64/0291* (2013.01); *C08G 64/305* (2013.01); *C08G 64/42* (2013.01)

(58) Field of Classification Search
None
See application file for complete search history.

(56) References Cited

U.S. PATENT DOCUMENTS

| | | | |
|---|---|---|---|
| 3,248,416 A * | 4/1966 | Stevens .................. | 558/266 |
| 3,280,078 A * | 10/1966 | Fritz Hostettler et al. ..... | 528/370 |
| 4,267,120 A | 5/1981 | Cuscurida et al. | |
| 2010/0041856 A1 | 2/2010 | Gross et al. | |
| 2011/0077352 A1 | 3/2011 | Nakamura et al. | |
| 2011/0184143 A1* | 7/2011 | Helou et al. .................. | 528/128 |

FOREIGN PATENT DOCUMENTS

| | | |
|---|---|---|
| DE | 1 568 342 | 5/1970 |
| EP | 1 288 241 | 8/2009 |
| EP | 2 213 695 | 8/2010 |
| EP | 2 213 696 | 8/2010 |
| WO | 2012/027725 | 3/2012 |
| WO | 2012/135186 | 10/2012 |
| WO | 2013/034750 | 3/2013 |

OTHER PUBLICATIONS

Yanfei Liu et al., "Synthesis, characterization and hydrolysis of an aliphatic polycarbonate by terpolymerization of carbon dioxide, propylene oxide and maleic anhydride", Polymer, 47, pp. 8453-8461, Nov. 9, 2006.

\* cited by examiner

*Primary Examiner* — David Buttner
(74) *Attorney, Agent, or Firm* — Wenderoth, Lind & Ponack, L.L.P.

(57) ABSTRACT

An unsaturated polycarbonate diol (A) comprising terminal hydroxyl groups, at least one repeating unit of formula (Ia) and at least one repeating unit selected from units of formula (Ib) and units of formula (II), wherein $R^{1a}$ is selected from the group consisting of $C_2$-$C_{20}$ acyclic alkylene group, $C_2$-$C_{20}$ ether group and $C_3$-$C_{20}$ ester group, $R^{1b}$ represents and $C_2$-$C_{20}$ acyclic alkenylene group, and $R^2$ represents a $C_2$-$C_{20}$ acyclic alkenylene group; the unsaturated polycarbonate diol (A) comprising at least one unsaturated carbon-carbon bond; and processes of preparing such an unsaturated polycarbonate diol (A):

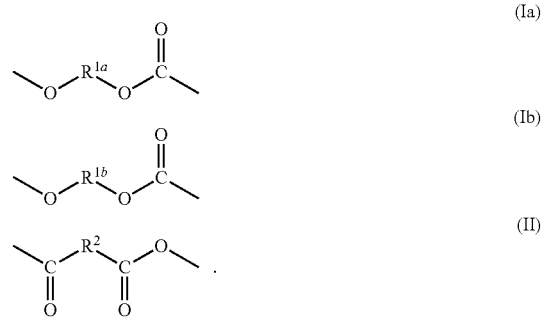

14 Claims, No Drawings

UNSATURATED POLYCARBONATE DIOL, PROCESS OF PREPARING SUCH POLYCARBONATE DIOL AND ITS USE

TECHNICAL FIELD

The present invention belongs to the technical field of the polymer manufacture. In particular, the present invention provides a new polycarbonate diol with double bonds in their structure, as well as a process of preparing such polycarbonate diol for the manufacture of thermoplastic polyurethanes, polyester elastomers, polyurethane dispersions, urethane acrylate, polycarbonate diacrylate and thermoset resins.

BACKGROUND ART

Several Polycarbonate diols comprising alkylene diols units are disclosed in the state of the art. In particular, patent document EP1288241 discloses polycarbonate diol comprising 1,6-hexanediol units and 1,5-pentanediol or 1,4-butanediol units, EP2213696 discloses polycarbonate diol comprising 1,6-hexanediol units and 1,4-butanediol units, EP2213695 discloses polycarbonate diol comprising 1,6-hexanediol units and 1,5-pentanediol units. These patent documents disclose that these polycarbonate diols have low crystallinity.

Moreover, polycarbonate diols (PCD) disclosed in the above-mentioned patent documents do not have reactive functional group other than hydroxyl groups. Therefore, these PCD were not suitable in order to produce polyurethane with higher crosslink density.

On the other hand, the patent application DE 1568342 discloses linear polyesters containing carbonate groups with predominantly hydroxyl terminations of the general formula

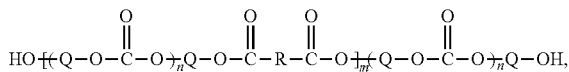

in which "n" stands for integers from 1 to 20, preferably 1 to 15, "m" for integers from 1 to 10, "Q" for the 1,4-dimethylene-cyclohexane radical and "R" for a saturated or unsaturated aliphatic or cycloaliphatic alkene radical or an arylene radical (except for the 1,4-phenylene radical). Products disclosed in that patent application show a high elasticity, even without the addition of softeners. Their adhesiveness is very good on automotive sheet metal and satisfactory on glass. In addition, these products are very soluble in the usual lacquer solvents, such as acetone, methyl ethyl ketone and acetic acid ethyl ester. Their adhesive capacity is excellent. However, the linear polyesters disclosed in patent application DE 1568342 are characterized by a high viscosity (see the comparative example).

DESCRIPTION OF THE INVENTION

In a first aspect, the present invention provides a new unsaturated polycarbonate diol (A) (also referred to as PCD (A) in the present patent application) comprising terminal hydroxyl groups, at least one repeating unit of formula (Ia) and at least one repeating unit selected from units of formula (Ib) and units of formula (II)

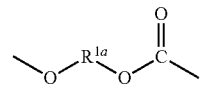

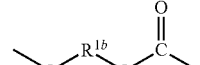

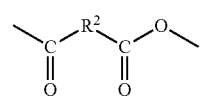

wherein
$R^{1a}$ is selected from the group consisting of $C_2$-$C_{20}$ acyclic alkylene group, $C_2$-$C_{20}$ ether group and $C_3$-$C_{20}$ ester group,
$R^{1b}$ represents and $C_2$-$C_{20}$ acyclic alkenylene group, and
$R^2$ represents a $C_2$-$C_{20}$ acyclic alkenylene group; the unsaturated polycarbonate diol (A) comprising at least one unsaturated carbon-carbon bond.

In the present patent application, it shall be understand that the acyclic alkylene group or the acyclic alkenylene group can be substituted, branched or both.

In the present patent application, the $C_2$-$C_{20}$ ether group shall be understand as corresponding to a group of formula $R^6$—O—$R^7$, wherein $R^6$ and $R^7$ are independent Cx-Cy acyclic alkylenes, and x+y is a number between 2 and 20.

Additionally, the $C_3$-$C_{20}$ ester group shall be understand as corresponding to a group of formula $R^6$—CO—O—$R^7$, wherein $R^6$ and $R^7$ are independent Cx-Cy acyclic alkylenes, and x+y is a number between 2 and 19.

The present invention provides a new unsaturated polycarbonate diol (A) with lower viscosity than the previous ones known in the art and, therefore, more suitable to be used in the manufacture of polyurethane. In particular, the lower viscosity allows an easier and lower energetic cost PCD handling. Preferably, the new unsaturated PCD (A) of the present invention has a viscosity lower than 20000 cps, more preferably lower than 10000 cps.

In a preferred embodiment, the present invention refers to the unsaturated PCD (A) as described in this patent application, wherein $R^{1a}$ represents a $C_2$-$C_{20}$ acyclic alkylene group; more preferably $C_2$-$C_7$ acyclic alkylene group. In a more preferred embodiment, $R^{1a}$ is selected from the group consisting of trimethylene, tetramethylene, pentamethylene, hexamethylene, 2-methylpropylene, 2,2-dimethyl propylene, 2-methylpentylene, 3-methylpentylene, 3,3-dimethylpentylene and 2-butil-2-etil trimethylene.

In a even more preferred embodiment, the unsaturated PCD (A) of the present invention comprises one repeating unit of formula (I) wherein $R^{1a}$ is hexamethylene.

In other preferred embodiment, the unsaturated polycarbonate diol (A) of the present invention comprises at least one repeating unit of formula (II). This unsaturated polycarbonate diol (A) has a higher reactivity when used in the manufacture of polyurethane compared with unsaturated PCD (A) of the invention that only includes repeating units of formula (Ia) and (Ib).

In a more preferred embodiment, the present invention refers to the unsaturated PCD (A) described in this patent application wherein any carbon atom next to the carbon atom of carboxyl group in repeating unit (II) belongs to a double bond. In an even more preferred embodiment, $R^2$ is —CH=CH—.

In other preferred embodiment, the unsaturated PCD (A) as described in the first aspect of this patent application further comprises at least one repeating unit of formula (III), wherein $R^3$ represents a $C_6$-$C_{20}$ hydrocarbon group including alicyclic structure.

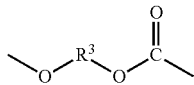

(III)

In the present invention, it shall be understood that the $C_6$-$C_{20}$ hydrocarbon group including alicyclic structure can be substituted, branched or both. Preferably, $R^3$ is a cyclohexane dialkylene. More preferably, this group is cyclohexane dimethylene.

In a more preferred embodiment, the unsaturated PCD (A) of the present invention comprises a repeating unit of formula (Ia), a repeating unit of formula (II) and a repeating unit of formula (III), wherein $R^{1a}$, $R^2$ and $R^3$ maintains the meaning as described above. More preferably, wherein $R^{1a}$ is hexamethylene, $R^2$ is —CH=CH— and $R^3$ is cyclohexane dimethylene.

In other preferred embodiment, the present invention also provides an unsaturated polycarbonate diol (A) comprising a repeating unit of formula (Ia) wherein $R^{1a}$ is an acyclic alkylene $C_2$-$C_{20}$, and a repeating unit of formula (Ib) wherein $R^{1b}$ is an acyclic alkenylene $C_2$-$C_{20}$. Preferably, the unsaturated PCD (A) comprises between 2 and 20 units.

In a more preferred embodiment, the molar ratio between the alkylene/alkenylene units is between 99/1 and 1/99.

In a even more preferred embodiment, the present invention describes the unsaturated polycarbonate diol (A) comprising repeating units of formula (Ia) wherein $R^{1a}$ is —(CH$_2$)$_6$—, and repeating units of formula (Ib) wherein $R^{1b}$ is —CH$_2$—CH=CH—CH$_2$—, with a molar ration between 99/1 and 1/99.

In other preferred embodiment, the molecular weight of the unsaturated PCD (A) as described in this patent application is between 400 and 10,000.

In a second aspect, the present invention also describes a process of preparing the unsaturated PCD (A) as described in the first aspect of this patent application, comprising reacting a precursor of at least one repeating unit of formula (Ia), with a precursor of at least one repeating unit selected from units of formula (Ib) and formula (II).

In a preferred embodiment, the present invention describes a process of preparing the unsaturated PCD (A) comprising at least one repeating unit of formula (II) as described in the first aspect of this patent application, wherein reacting a polycarbonate diol (B) (also referred to as PCD(B) in the present patent application) comprising at least one repeating unit of formula (Ia)

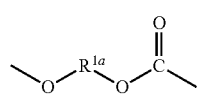

(Ia)

wherein
$R^{1a}$ is selected from the group consisting of $C_2$-$C_{20}$ acyclic alkylene group, $C_2$-$C_{20}$ ether group and $C_3$-$C_{20}$ ester group; with a compound selected from the group consisting of compound of formula (IV) and compound of formula (V)

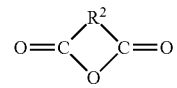

(IV)

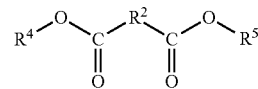

(V)

wherein
$R^2$ maintains the meaning as described in the first aspect of this patent application, and
$R^4$ and $R^5$ are independently selected from the group consisting of hydrogen and $C_1$-$C_6$ alkyl group.

In a preferred embodiment, this patent application describes the process of preparing the unsaturated PCD (A) of the present invention wherein the PCD (B) is a mixture of two different repeating units of formula (Ia).

In other preferred embodiment, the process of preparing the unsaturated PCD (A) comprises reacting a polycarbonate diol (B) comprising at least one, preferable two, repeating units of formula (Ia) wherein $R^{1a}$ is selected from the group consisting of trimethylene, tetramethylene, pentamethylene, hexamethylene, 2-methylpropylene, 2,2-dimethylpropylene, 2-methylpentylene, 3-methylpentylene, 3,3-dimethylpentylene and 2-butil-2-etil trimethylene; with a compound of formula (IV), wherein $R^2$ is —CH=CH—.

In other preferred embodiment, the process of preparing the unsaturated PCD (A) comprises reacting a polycarbonate diol (B) with a compound of formula (IV) or (V) as described above, in presence of one or more diol monomers of formula HO—$R^{1a}$—OH, wherein $R^{1a}$ is the same as the repeating unit of formula (Ia) comprised in the PCD (B).

In other preferred embodiment, this patent application also describes the process of preparing the unsaturated PCD (A) of the present invention wherein the PCD (B) comprises repeating units of formula (Ia) as described above, and repeating units of formula (III), wherein $R^3$ maintains the meaning as described in the first aspect of this patent application.

In a more preferred embodiment, the process of preparing the unsaturated PCD(A) comprises reacting a polycarbonate diol (B) comprising one repeating unit of formula (Ia) wherein $R^{1a}$ is selected from the group consisting of trimethylene, tetramethylene, pentamethylene, hexamethylene, 2-methylpropylene, 2,2-dimethylpropylene, 2-methylpentylene, 3-methylpentylene, 3,3-dimethylpentylene and 2-butyl-2-ethyl trimethylene; and a further repeating unit of formula (III) wherein $R^3$ is a branched cyclohexane; with a compound of formula (IV), wherein $R^2$ is —CH=CH—.

In other preferred embodiment, the process of preparing the unsaturated PCD(A) comprises reacting a polycarbonate diol (B) with a compound of formula (IV) or (V) as described above, in presence of diol monomers of formula HO—$R^{1a}$—OH and HO—$R^3$—OH, wherein $R^{1a}$ and $R^3$ are the same as the repeating unit of formula (I) comprised in the PCD (B).

As mentioned in this patent application, one of the main uses of the PCD is the manufacture of polyurethane. The molecular weight of the PCD affects significantly the properties of the final polyurethane produced. The process of this invention allows the production of the unsaturated PCD (A) with the desirable molecular weight by using a polycarbonate diol (B) with the required molecular weight as starting material.

Thus, the expression "the required molecular weight" as used in this patent application should be understand as the molecular weight, preferably between 400 and 10,000, required in order to obtain the unsaturated polycarbonate diol (A) as described in the first aspect of this invention. In a more preferred embodiment, the molecular weight of PCD (B) is between 500 and 4,000.

In other preferred embodiment, the present invention refers to the process of preparing the unsaturated PCD (A) as described in this patent application, wherein the process further comprises providing the polycarbonate diol (B) with the required molecular weight, preferably between 400 and 10,000, by polymerization of one or more diols of formula (VI) with a carbonate to obtain the polycarbonate diol (B)

$$HO-R^{1a}-OH \quad (VI)$$

wherein $R^{1a}$ is selected from the group consisting of $C_2$-$C_{20}$ acyclic alkylene group, $C_2$-$C_{20}$ ether group and $C_3$-$C_{20}$ ester group.

Any source of carbonate can be used for manufacture of polycarbonatediol according to the present invention. Examples of suitable carbonates may be, but are not limited, dialkyl carbonates such as dimethyl carbonate, diethyl carbonate, dipropyl carbonate, and dibutyl carbonate; diaryl carbonates such as diphenyl carbonates and alkylene carbonates such as ethylene carbonate, trimethylene carbonate, 1,2 propylene carbonate, 1,2 butylene carbonate, 1,3 butylene carbonate and 1,2 pentylene carbonate. Preferred carbonates are dimethyl carbonate and ethylene carbonate.

The polycarbonate diol (B) can be obtained as described in the US Patent Application No 2011/077352 A1. In particular, PCD (B) can be obtained preferably using an excessive molar amount of poliol (VI) regarding the carbonate compound (VII). The reaction can be carried out maintaining the temperature between 160 and 200° C. and pressure of 50 mm Hg for 5 to 6 hours, and then at 200 to 220° C. and a pressure of 100 mm Hg or less for about 4 hours. To carry out the reaction while removing the alcohol produced is preferable. However, if the carbonate compound is also removed with the alcohol by azeotropic distillation, an excessive amount of the carbonate compound (VII) may be added. Also, in the above-mentioned reaction, a catalyst such as titanium tetrabutoxide may be used.

In a third aspect, the present invention also refers to the use of the unsaturated PCD of formula (A) as described in the first aspect of the present invention to manufacture polyurethane polyester elastomers, polyurethane dispersions, urethane acrylate, polycarbonate diacrylate and thermoset resins.

EXAMPLES

Example 1

Synthesis of an Unsaturated Polycarbonate Diol by Reacting Homopolymer 1,6-hexanediol Polycarbonate with Maleic Anhydride In a reactor equipped with a stirrer and a thermometer, 477 g of an homopolymer of polycarbonatediol obtained by reacting 1,6-hexanediol with dimethylcarbonate (product known as UH200N from UBE Corporation Europe, S.A.) with OH value 58.5 mgKOH/g was mixed with 480 g of 1,6-hexanediol and 301 g of maleic anhydride at 150° C. Then temperature was increased until 190° C. under nitrogen streaming. During reaction water was removed from the reaction mixture by distillation.

After 10 hours, vacuum was applied to remove remaining amounts of reaction water. The result was a product with a OH value 118 mgKOH/g, viscosity 330 cps at 75° C. and acid value of 0.29 mgKOH/g.

Measurement of the Physical Properties of Polycarbonatediol and a Polycarbonatediol Copolymer was Performed as Follows:

(1) Hydroxyl value (OH value) is measured based on the indicator titration method of JIS K 1557. Sample is esterificated with phthalic anhydride pyridine solution. The reagent in excess is titrated by potassium hydroxide solution. Esterification of PCD is accelerated by imidazole.
Calculation: Hydroxyl value is calculated as following.

$$\text{Hydroxyl value} = (B-A) \times f \times 56.1/S + \text{Acid value}$$

wherein
B: the volume of 0.5 mol/L KOH solution required to titrate the blank (ml)
A: the volume of 0.5 mol/L KOH solution required to titrate the sample (ml)
f: normality of KOH solution
S: the weight of the sample (g)

(2) Acid value: it measured based on the indicator titration method of JIS K 1557.
The sample dissolved in ethanol-toluene mixture is titrated by KOH ethanol solution. Acid value is calculated as following:

$$\text{Acid value} = (B-A) \times f \times 56.1/S$$

wherein:
B: the volume of 0.1 mol/L KOH solution required to titrate the blank (ml)
A: the volume of 0.1 mol/L KOH solution required to titrate the sample (ml)
f: normality of KOH volumetric standard ethanol solution
S: the weight of the sample (g)

(3) Viscosity is measured at 75° C. using E type viscosity meter.

Example 2

Synthesis of an Unsaturated Polycarbonate Diol by Reacting Copolymer 1,6-hexanediol-cyclohexanedimethanol Polycarbonate with Maleic Anhydride In a reactor equipped with a stirrer and a thermometer, 755 g of a copolymer of 1,6-hexanediol and cyclohexanedimethanol with dimethylcarbonate (product known as UM90) with OH value 123.6 mgKOH/g was mixed with 202 g of 1,6-hexanediol, 492 g of cyclohexanedimethanol and 417 g of maleic anhydride at 150° C. Then temperature was increased until 180° C. under nitrogen streaming. During reaction water was removed from the reaction mixture by distillation.

After 7 hours, vacuum was applied to remove remaining amounts of reaction water. The results was yellowish product with a OH value 104.9 mgKOH/g, acid value of 0.79 mgKOH/g and 671 cps of viscosity at 75° C. was obtained.

Example 3

Synthesis of an Unsaturated Polycarbonate Diol by Reacting Homopolymer 1,6-hexanediol Polycarbonate with Butanediol In a reactor equipped with a stirrer, a thermometer and a fractionating column 406 g of dimethyl carbonate, 300 g of 1,6-hexanediol, 96 g of 1,4-butenediol and 0.05 g of tetra-n-butoxy titanium were charged. The mixture was reacted between 95° C. and 170° C., while subjecting methanol and dimethyl carbonate produced to azeotropic distillation. After substantially ceasing distillation of methanol, the mixture was reduced to 100 mmbar or less and further reacted for 4 hours. Incidentally, the reaction was carried out under nitrogen atmosphere. After completion of the reaction, the reaction mixture was cooled to obtain a solid with a hydroxyl value of 102 mg KOH/g and 570 cps at 75° C.

Example 4

Synthesis of an Unsaturated Polycarbonate Diol by Reacting Copolymer 1,6-hexanediol-1,5-pentanediol Polycarbonate with Maleic Anhydride In a reactor equipped with a stirrer and a thermometer, 475 g of a copolymer of 1,6-hexanediol and 1,5 pentanediol with dimethylcarbonate (product known as PH) with OH value 56.9 mgKOH/g was mixed with 250 g of 1,6-hexanediol, 220 g of 1,5 pentanediol and 320 g of maleic anhydride at 150° C. Then temperature was increased until 190° C. under nitrogen streaming. During reaction water was removed from the reaction mixture by distillation.

After 4 hours, vacuum 200 mmbar was applied to remove remaining amounts of reaction water. The results was yellowish product with a OH value 90.5 mgKOH/g, acid value of 0.56 mgKOH/g and 674 cps of viscosity at 75° C. was obtained.

Example 5

Synthesis of an Unsaturated Polycarbonate Diol by Reacting Homopolymer Neopentyl Glycol Polycarbonate with Maleic Anhydride In a reactor equipped with a stirrer and a thermometer, 413 g of a homopolymer of neopentyl glycol with OH value 50.2 mgKOH/g was mixed with 329 g of neopentyl glycol and 240 g of maleic anhydride at 150° C. Then temperature was increased until 180° C. under nitrogen streaming. During reaction water was removed from the reaction mixture by distillation.

After 8 hours, yellowish product with a OH value 258 mgKOH/g, and 1306 cps of viscosity at 75° C. was obtained.

Comparative Example

Reproduction of the Example 1 of DE 1568342

In a reactor equipped with a stirrer and a thermometer, 308 g of an homopolymer of cyclohexanedimethanol with dimethylcarbonate (product known as UC) was mixed with 477 g of cyclohexanedimethanol and 241 g of maleic anhydride at 150° C. Then temperature was increased until 190° C. under nitrogen streaming. During reaction water was removed from the reaction mixture by distillation.

After 8 hours, vacuum was applied to remove remaining amounts of reaction water. The result was yellowish product with a OH value 96.8 mgKOH/g and acid value of 0.6. mgKOH/g and 77808 cps of viscosity at 75° C. was obtained.

The invention claimed is:

1. An unsaturated polycarbonate diol (A) comprising terminal hydroxyl groups, at least one repeating unit of formula (Ia) and at least one repeating unit selected from the group consisting of a repeating unit of formula (Ib) and a repeating unit of formula (II)

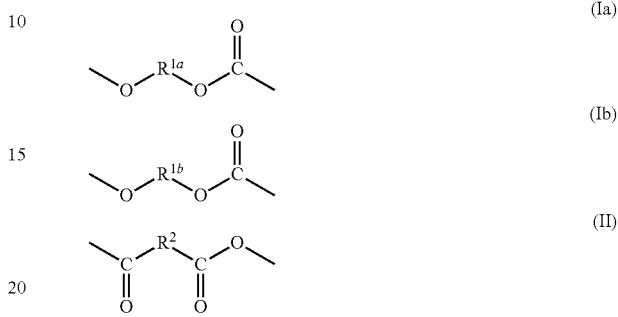

wherein
   $R^{1a}$ is selected from the group consisting of a $C_2$-$C_{20}$ acyclic alkylene group and a $C_2$-$C_{20}$ ether group of formula $R^6$—O—$R^7$ wherein $R^6$ and $R^7$ are independent Cx-Cy acyclic alkylenes and x+y is a number between 2 and 20,
   $R^{1b}$ is a $C_2$-$C_{20}$ acyclic alkenylene group, and
   $R^2$ is a $C_2$-$C_{20}$ acyclic alkenylene group;
   wherein the unsaturated polycarbonate diol (A) comprises at least one unsaturated carbon-carbon bond;
   a) provided that when the unsaturated polycarbonate diol (A) comprises at least one repeating unit of formula (Ia) and at least one repeating unit of formula (Ib), $R^{1a}$ is selected from the group consisting of a $C_2$-$C_{20}$ acyclic alkylene different from trimethylene, and a $C_2$-$C_{20}$ ether group of formula $R^6$—O—$R^7$ wherein $R^6$ and $R^7$ are independent Cx-Cy acyclic alkylenes and x+y is a number between 2 and 20, and $R^{1b}$ is an unbranched $C_2$-$C_{20}$ acyclic alkenylene group; and
   b) provided that when the unsaturated polycarbonate diol (A) comprises at least one repeating unit of formula (Ia) and at least one repeating unit of formula (II), $R^{1a}$ is a $C_2$-$C_{20}$ acyclic alkylene group selected from the group consisting of trimethylene, tetramethylene, pentamethylene, hexamethylene, 2-methylpropylene, 2,2-dimethylpropylene, 2-methylpentylene, 3-methylpentylene, 3,3-dimethylpentylene and 2-butyl-2-ethyl trimethylene, and the unsaturated polycarbonate diol (A) is obtained by a process comprising:
   i) providing a polycarbonate diol (B) by polymerization of one or more diols of formula (VI)

wherein
   $R^{1a}$ is selected from the group consisting of trimethylene, tetramethylene, pentamethylene, hexamethylene, 2-methylpropylene, 2,2-dimethylpropylene, 2-methylpentylene, 3-methylpentylene, 3,3-dimethylpentylene and 2-butyl-2-ethyl trimethylene;
with a carbonate selected from the group consisting of dialkyl carbonate and diaryl carbonate, and ii) reacting the polycarbonate diol (B) comprising at least one repeating unit of formula (Ia)

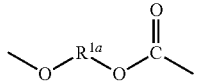
(Ia)

wherein
$R^{1a}$ is as defined above;
with a compound selected from the group consisting of a compound of formula (IV) and a compound of formula (V)

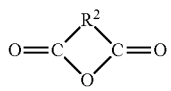
(IV)

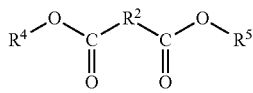
(V)

wherein
$R^2$ is a $C_2$-$C_{20}$ acyclic alkenylene group; and
$R^4$ and $R^5$ are independently selected from the group consisting of hydrogen and a $C_1$-$C_6$ alkyl group.

2. The unsaturated polycarbonate diol (A) according to claim 1, wherein the unsaturated polycarbonate diol (A) comprises at least one repeating unit of formula (Ia) and at least one repeating unit of formula (Ib), and $R^{1a}$ is selected from the group consisting of tetramethylene, pentamethylene, hexamethylene, 2-methylpropylene, 2,2-dimethylpropylene, 2-methylpentylene, 3-methylpentylene, 3,3-dimethylpentylene and 2-butyl-2-ethyl trimethylene.

3. The unsaturated polycarbonate diol (A) according to claim 1, wherein the unsaturated polycarbonate diol (A) comprises at least one repeating unit of formula (II).

4. The unsaturated polycarbonate diol (A) according to claim 3, wherein any carbon atom next to the carbon atom of a carboxyl group in repeating unit (II) forms a double bond with the carbon adjacent to such carbon atom on the substituent $R^2$ of the repeating unit (II).

5. The unsaturated polycarbonate diol (A) according to claim 4, wherein $R^2$ is —CH=CH—.

6. An unsaturated polycarbonate diol (A) comprising terminal hydroxyl groups, at least one repeating unit of formula (Ia), at least one repeating unit selected from the group consisting of a repeating unit of formula (Ib) and a repeating unit of formula (II), and at least one repeating unit of formula (III),

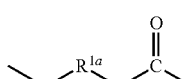
(Ia)

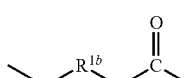
(Ib)

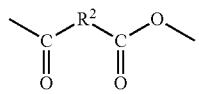
(II)

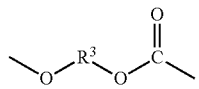
(III)

wherein
$R^{1a}$ is selected from the group consisting of a $C_2$-$C_{20}$ acyclic alkylene group and a $C_2$-$C_{20}$ ether group of formula $R^6$—O—$R^7$ wherein $R^6$ and $R^7$ are independent Cx-Cy acyclic alkylenes and x+y is a number between 2 and 20,
$R^{1b}$ is a $C_2$-$C_{20}$ acyclic alkenylene group,
$R^2$ is a $C_2$-$C_{20}$ acyclic alkenylene group; and
$R^3$ is a $C_6$-$C_{20}$ hydrocarbon group optionally containing an alicyclic structure;
wherein the unsaturated polycarbonate diol (A) comprises at least one unsaturated carbon-carbon bond;
a) provided that when the unsaturated polycarbonate diol (A) comprises at least one repeating unit of formula (Ia) wherein $R^{1a}$ is a $C_2$-$C_{20}$ acyclic alkylene group, at least one repeating unit of formula (Ib) and at least one repeating unit of formula (III), $R^{1b}$ is an unbranched $C_2$-$C_{20}$ acyclic alkenylene group, and
b) provided that when the unsaturated polycarbonate diol (A) comprises at least one repeating unit of formula (Ia), at least one repeating unit of formula (II) and at least one repeating unit of formula (III), the unsaturated polycarbonate diol (A) is obtained by a process comprising:
i) providing a polycarbonate diol (B) by polymerization of one or more diols of formula HO—$R^{1a}$—OH and HO—$R^3$—OH,
wherein
$R^{1a}$ is selected from the group consisting of a $C_2$-$C_{20}$ acyclic alkylene group and a $C_2$-$C_{20}$ ether group of formula $R^6$—O—$R^7$ wherein $R^6$ and $R^7$ are independent Cx-Cy acyclic alkylenes and x+y is a number between 2 and 20, and
$R^3$ is a $C_6$-$C_{20}$ hydrocarbon group optionally including an alicyclic structure;
with a carbonate selected from the group consisting of dialkyl carbonate and diaryl carbonate, and
ii) reacting the polycarbonate diol (B) comprising at least one repeating unit of formula (Ia) and at least one repeating unit of formula (III)

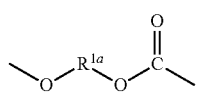
(Ia)

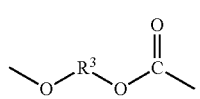
(III)

wherein
$R^{1a}$ and $R^3$ are as defined above;

with a compound selected from the group consisting of a compound of formula (IV) and a compound of formula (V)

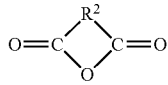
(IV)

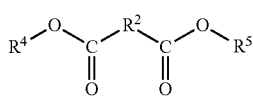
(V)

wherein
$R^2$ is a $C_2$-$C_{20}$ acyclic alkenylene group; and
$R^4$ and $R^5$ are independently selected from the group consisting of hydrogen and a $C_1$-$C_6$ alkyl group.

7. The unsaturated polycarbonate diol (A) according to claim 6, wherein $R^3$ is a cyclohexane dialkylene group.

8. The unsaturated polycarbonate diol (A) according to claim 6, comprising a repeating unit of formula (Ia) wherein $R^{1a}$ is a $C_2$-$C_{20}$ acyclic alkylene and a repeating unit of formula (Ib) wherein $R^{1b}$ is a $C_2$-$C_{20}$ acyclic unbranched alkenylene.

9. The unsaturated polycarbonate diol (A) according to claim 1, wherein the molecular weight is between 400 and 10,000.

10. A process of preparing the unsaturated polycarbonate diol (A) according to claim 1, comprising reacting a precursor of at least one repeating unit of formula (Ia) with a precursor of at least one repeating unit of formula (Ib).

11. A process of preparing the unsaturated polycarbonate diol (A) according to claim 1, comprising:
a) providing a polycarbonate diol (B) by polymerization of one or more diols of formula (VI)

HO—$R^{1a}$—OH    (VI)

wherein
$R^{1a}$ is selected from the group consisting of a $C_2$-$C_{20}$ acyclic alkylene group and a $C_2$-$C_{20}$ ether group of formula $R^6$—O—$R^7$ wherein $R^6$ and $R^7$ are independent Cx-Cy acyclic alkylenes and x+y is a number between 2 and 20;
with a carbonate selected from the group consisting of a dialkyl carbonate and a diaryl carbonate, and
b) reacting the polycarbonate diol (B) comprising at least one repeating unit of formula (Ia)

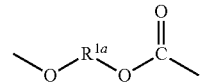
(Ia)

wherein
$R^{1a}$ is as defined above;
with a compound selected from the group consisting of a compound of formula (IV) and a compound of formula (V)

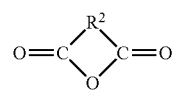
(IV)

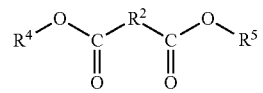
(V)

wherein
$R^2$ is a $C_2$-$C_{20}$ acyclic alkenylene group; and
$R^4$ and $R^5$ are independently selected from the group consisting of hydrogen and a $C_1$-$C_6$ alkyl group.

12. The unsaturated polycarbonate diol (A) according to claim 6, wherein the molecular weight is between 400 and 10,000.

13. The unsaturated polycarbonate diol (A) according to claim 1, wherein the viscosity is lower than 10,000 cps.

14. The unsaturated polycarbonate diol (A) according to claim 6, wherein the viscosity is lower than 10,000 cps.

* * * * *